US012573640B2

(12) United States Patent　　(10) Patent No.: US 12,573,640 B2
Chinone et al.　　(45) Date of Patent: Mar. 10, 2026

(54) ELECTRODE CATALYST LAYER, MEMBRANE ELECTRODE ASSEMBLY, AND POLYMER ELECTROLYTE FUEL CELL

(71) Applicant: TOPPAN INC., Tokyo (JP)

(72) Inventors: Hiroyuki Chinone, Tokyo (JP); Madoka Ozawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 538 days.

(21) Appl. No.: 18/122,438

(22) Filed: Mar. 16, 2023

(65) Prior Publication Data

US 2023/0275239 A1　　Aug. 31, 2023

Related U.S. Application Data

(63) Continuation of application No. PCT/JP2021/034379, filed on Sep. 17, 2021.

(30) Foreign Application Priority Data

Sep. 17, 2020　　(JP) ................................. 2020-156525

(51) Int. Cl.
H01M 4/92 (2006.01)
H01M 8/10 (2016.01)
(Continued)

(52) U.S. Cl.
CPC ......... H01M 4/926 (2013.01); H01M 8/1018 (2013.01); H01M 8/1065 (2013.01); H01M 2008/1095 (2013.01)

(58) Field of Classification Search
CPC .. H01M 4/926; H01M 8/1018; H01M 8/1065; H01M 4/8668; H01M 4/8673; H01M 4/86; H01M 4/92; H01M 8/10
See application file for complete search history.

(56) References Cited

U.S. PATENT DOCUMENTS

2009/0142647 A1　　6/2009　Sugi et al.
2013/0052560 A1　　2/2013　Kawaji et al.
2015/0303487 A1 *　10/2015　Kamai ................. C25B 11/043
502/101

FOREIGN PATENT DOCUMENTS

EP　　　3 694 037 A1　　8/2020
JP　　　2003-115299 A　　4/2003
JP　　　2006-108031 A　　4/2006

OTHER PUBLICATIONS

European Extended Search Report issued in corresponding European Patent Application No. 21869465.1 dated Mar. 7, 2025.
(Continued)

*Primary Examiner* — Stewart A Fraser
(74) *Attorney, Agent, or Firm* — Foley & Lardner LLP

(57) ABSTRACT

An object is to provide an electrode catalyst layer, a membrane electrode assembly, and a polymer electrolyte fuel cell that can suppress decrease in durability of the membrane electrode assembly and decrease in power generation performance of the polymer electrolyte fuel cell by suppressing crack generation in the electrode catalyst layer. An electrode catalyst layer according to one aspect of the present invention is an electrode catalyst layer including at least: a catalytic substance; aggregates of polymer electrolytes; and polymer electrolyte fibers. In the electrode catalyst layer, an amount of phosphorus and an amount of platinum defined via elemental analysis by energy dispersive X-ray spectroscopy (EDX) satisfy a following equation (1)

$$0 < P/Pt \leq 3.0$$

Equation (1).

7 Claims, 4 Drawing Sheets

(51) Int. Cl.
H01M 8/1018 (2016.01)
H01M 8/1065 (2016.01)

(56) References Cited

OTHER PUBLICATIONS

Mamlouk et al., "Phosphoric acid-doped electrodes for a PBI polymer membrane fuel cell", International Journal of Energy Research, vol. 35, No. 6, Apr. 7, 2011, pp. 507-519.

International Searching Authority, "International Search Report," issued in connection with International Patent Application No. PCT/JP2021/034379, dated Nov. 16, 2021.

International Searching Authority, "Written Opinion," issued in connection with International Patent Application No. PCT/JP2021/034379, dated Nov. 16, 2021.

Office Action issued in corresponding European Patent Application No. 21869465.1 dated Jan. 28, 2026.

Qingfeng et al., "Phosphoric Acid Doped Polybenzimidazole Membranes: Physiochemical Characterization and Fuel Cell Applications", Journal of Applied Electrochemistry, vol. 31. No. 7. Jul. 1. 2001. pp. 773-779.

Wang et al., "A H2O2 Fuel Cell Using Acid Doped Polybenzimidazole as Polymer Electrolyte", Electrochimica ACTA, vol. 41, No. 2, Feb. 1, 1996, pp. 193-197.

* cited by examiner

EQUATION 1)P/Pt

ELECTRODE CATALYST LAYER, MEMBRANE ELECTRODE ASSEMBLY, AND POLYMER ELECTROLYTE FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/034379, filed on Sep. 17, 2021, which in turn claims the benefit of JP 2020-156525, filed Sep. 17, 2020, the disclosures of all which are incorporated herein by reference in its entirety.

TECHNICAL FIELD

The present invention generally relates to an electrode catalyst layer provided in a fuel cell, a membrane electrode assembly having an electrode catalyst layer, and a polymer electrolyte fuel cell.

BACKGROUND

In recent years, fuel cells have been attracting attention as an effective solution to environmental issues and energy issues. Fuel cells oxidize fuel such as hydrogen using an oxidant such as oxygen and convert chemical energy involved in the oxidization into electrical energy.

Fuel cells are classified into alkaline, phosphoric acid, polymer, molten carbonate, solid-oxide types, etc. depending on the type of electrolyte. Since polymer electrolyte fuel cells (PEFC) operate at low temperatures, have high power density, and can be made compact and lightweight, they are expected to be used as portable power sources, household power sources, and automotive power sources.

The polymer electrolyte fuel cell (PEFC) includes an electrolyte membrane, specifically, a polymer electrolyte membrane sandwiched between a fuel electrode (anode) and an air electrode (cathode). A fuel gas containing hydrogen is supplied to the fuel electrode, and an oxidant gas containing oxygen is supplied to the air electrode to generate electric power by an electrochemical reaction as follows.

Anode: $H_2 \rightarrow \rightarrow 2H^+ + 2e^-$      (Reaction 1)

Cathode: $\frac{1}{2}O_2 + 2H^+ + 2e^- \rightarrow H_2O$      (Reaction 2)

The anode and the cathode are each formed of a laminated structure which includes an electrode catalyst layer and a gas diffusion layer. The fuel gas supplied to an anode-side catalyst layer is converted to protons and electrons by an electrode catalyst (Reaction 1).

The protons pass through a polymer electrolyte in the anode-side electrode catalyst layer, and then through the polymer electrolyte membrane, and migrate to the cathode. The electrons pass through an external circuit and then migrate to the cathode. In the cathode-side electrode catalyst layer, the protons, the electrons, and the oxidant gas supplied from outside react and generate water (Reaction 2).

Thus, as electrons migrate through an external circuit, electric power is generated (PTL 1).

The electrode catalyst layer is generally composed of platinum-supporting carbon and a polymer electrolyte. Carbon contributes to electron conduction, and the polymer electrolyte contributes to proton conduction. The balance of these types and contents contributes significantly to power generation performance.

On the other hand, during power generation, the diffusion of hydrogen and oxygen into the fuel cell (gas diffusion) and the drainage performance of water generated during power generation are also important. Fuel cells having both high gas diffusion and drainage properties can derive high power generation performance.

CITATION LIST

[Patent Literature] PTL 1: JP 2003-115299 A

SUMMARY OF THE INVENTION

Technical Problem

In production of electrode catalyst layers, cracks may occur in the electrode catalyst layers due to shrinkage as a result of drying.

The inventors of the present invention have found that when cracks are present in the electrode catalyst layer, the polymer electrolyte membrane may be exposed through the crack in the membrane electrode assembly and that such exposure of the polymer electrolyte membrane may cause a decrease in durability of the membrane electrode assembly or a decrease in power generation performance of the polymer electrolyte fuel cell.

The present invention has an object to provide an electrode catalyst layer, a membrane electrode assembly, and a polymer electrolyte fuel cell that can suppress decrease in durability of the membrane electrode assembly and decrease in power generation performance of the polymer electrolyte fuel cell by suppressing crack generation in the electrode catalyst layer.

Solution to Problem

In order to solve the above problems, an electrode catalyst layer according to one aspect of the present invention is an electrode catalyst layer including at least: a catalyst; catalyst-supporting carbon particles which support the catalyst; a polymer electrolyte; and a fibrous substance. In the electrode catalyst layer, an amount of phosphorus (P) and an amount of platinum (Pt) defined via elemental analysis by energy dispersive X-ray spectroscopy (EDX) satisfy a following equation (1).

$$0 < P/Pt \leq 3.0 \qquad \text{Equation (1)}$$

The electrode catalyst layer according to one aspect of the present invention may have an average fiber diameter of the fibrous substance in the range of 100 nm or more and 500 nm or less.

The electrode catalyst layer according to one aspect of the present invention may have an average fiber length of the fibrous substance in the range of 1 μm or more and 150 μm or less.

The electrode catalyst layer according to one aspect of the present invention may further include carbon fibers.

In the electrode catalyst layer according to one aspect of the present invention, the fibrous substance may be composed of a polymer electrolyte.

A membrane electrode assembly according to one aspect of the present invention includes: a polymer electrolyte membrane; and a pair of electrode catalyst layers sandwiching the polymer electrolyte membrane, wherein at least one of the pair of electrode catalyst layers is the electrode catalyst layer described above.

A polymer electrolyte fuel cell according to one aspect of the present invention includes: the membrane electrode assembly described above; and a pair of separators sandwiching the membrane electrode assembly.

Advantageous Effects of the Invention

According to one aspect of the present invention, occurrence of cracks in the electrode catalyst layer can be reduced. With fewer cracks, deformation of the electrolyte film due to the change in humidity during power generation can be suppressed, making it less prone to breakage. Therefore, it is possible to prevent deterioration in the durability of the membrane electrode assembly and degradation in the power generation performance of the polymer electrolyte fuel cell.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

(Overall Configuration)

Figure 1:
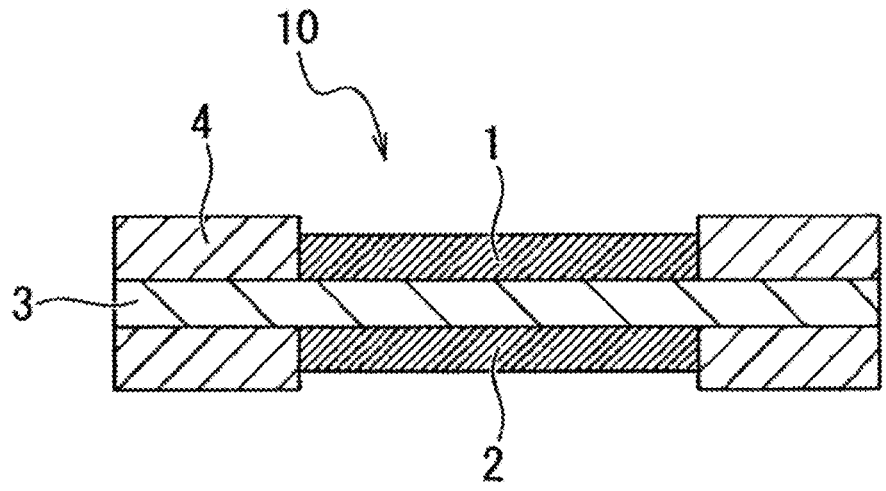
FIG. 1 is a cross-sectional view illustrating a configuration example of a membrane electrode assembly according to an embodiment of the present invention.

FIG. 1 is a cross-sectional view schematically illustrating a configuration example of a membrane electrode assembly according to an embodiment of the present invention.

As shown in FIG. 1, a membrane electrode assembly 10 includes a polymer electrolyte membrane 3 and two electrode catalyst layers, an air electrode-side electrode catalyst layer 1 and a fuel electrode-side electrode catalyst layer 2. The fuel electrode-side electrode catalyst layer 2 is an electrode catalyst layer used for the fuel electrode, which is the anode of the polymer electrolyte fuel cell, and the air electrode-side electrode catalyst layer 1 is an electrode catalyst layer used for the air electrode, which is the cathode of the polymer electrolyte fuel cell.

The polymer electrolyte membrane 3 is arranged between the air electrode-side electrode catalyst layer 1 and the fuel electrode-side electrode catalyst layer 2. That is, the polymer electrolyte membrane 3 is sandwiched between a pair of electrode catalyst layers (air electrode-side electrode catalyst layer 1 and fuel electrode-side electrode catalyst layer 2). The air electrode-side electrode catalyst layer 1 is in contact with one (front surface) of the two surfaces of the polymer electrolyte membrane 3, and the fuel electrode-side electrode catalyst layer 2 is in contact with the other (rear surface) of the two surfaces of the polymer electrolyte membrane 3.

When viewed from a direction facing one of the surfaces of the polymer electrolyte membrane 3, the outer shape of the air electrode-side electrode catalyst layer 1 is substantially the same as the outer shape of the fuel electrode-side electrode catalyst layer 2. The outer shape of the polymer electrolyte membrane 3 is larger than each of the outer shapes of the electrode catalyst layers 1 and 2. That is, when the membrane electrode assembly 10 is viewed in the thickness direction, the air electrode-side electrode catalyst layer 1 and the fuel electrode-side electrode catalyst layer 2 overlap each other through the polymer electrolyte membrane 3, and the outer edge of the polymer electrolyte membrane 3 is exposed without overlapping the air electrode-side electrode catalyst layer 1 or the fuel electrode-side electrode catalyst layer 2. The outer shape of the polymer electrolyte membrane 3 and the outer shapes of the electrode catalyst layers 1 and 2 are not specifically limited, and may be, for example, rectangular.

(Polymer Electrolyte Membrane)

The polymer electrolyte membrane 3 is a membrane containing polymer electrolyte. The polymer electrolyte used for the polymer electrolyte membrane 3 may be one having proton conductivity, and may be, for example, a fluorine-based polymer electrolyte or a hydrocarbon-based polymer electrolyte. Examples of the fluorine-based polymer electrolyte include Nafion (registered trademark: manufactured by DuPont). Examples of the hydrocarbon-based polymer electrolyte include engineering plastics and compounds in which a sulfonate group is introduced into a copolymer of engineering plastics.

(Electrode Catalyst Layer)

Figure 2:
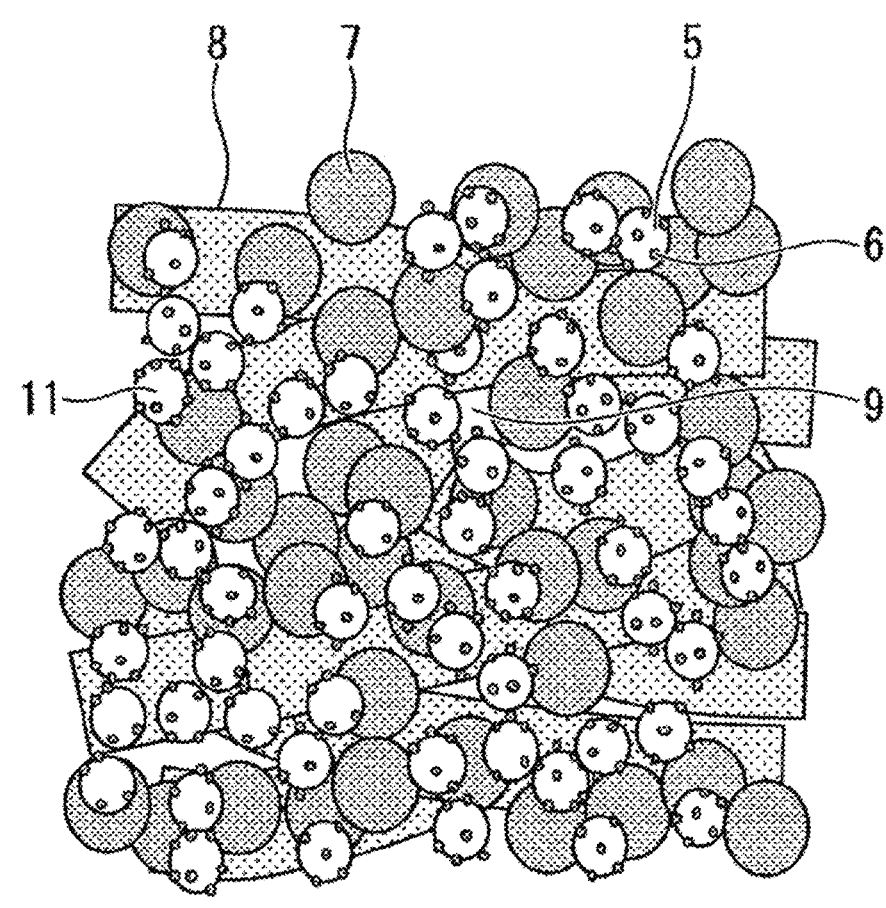
FIG. 2 is a cross-sectional view illustrating a first configuration example of an electrode catalyst layer according to the embodiment of the present invention.

FIG. 2 is a schematic cross-sectional view illustrating a first configuration of the electrode catalyst layer of the present embodiment. As shown in FIG. 2, each of the air electrode-side electrode catalyst layer 1 and the fuel electrode-side electrode catalyst layer 2 include: catalytic substance-supporting carbon bodies 11, which are carbon particles 5 that support a catalytic substance (hereinafter also simply referred to as "catalyst" or "catalyst particles") 6; aggregates 7 of polymer electrolytes; and polymer electrolyte fibers (fibrous substance) 8, which are fibrous polymer electrolytes.

The polymer electrolyte fibers 8 are, for example, organic electrolyte fibers such as fibrous substance composed of electrolytes. In the electrode catalyst layers 1 and 2, the aggregates 7 of polymer electrolytes and the polymer electrolyte fibers 8 are present around the dispersed catalytic substance-supporting carbon bodies 11, and holes 9 are formed between these catalytic substance-supporting carbon bodies 11. If the polymer electrolyte fiber 8 is an organic electrolyte fiber, excellent flexibility can be imparted to the electrode catalyst layers 1 and 2. If the polymer electrolyte fiber 8 is an organic electrolyte fiber composed of an electrolyte, it is possible to impart excellent proton conductivity to the electrode catalyst layers 1 and 2 while imparting excellent flexibility to the electrode catalyst layers 1 and 2.

The content of the polymer electrolyte fiber 8 is preferably in the range of 2% by mass or more and 50% by mass or less, more preferably in the range of 10% by mass or more and 30% by mass or less, and more preferably in the range of 10% by mass or more and 20% by mass or less with respect to the content of the aggregate 7 of the polymer electrolyte. If the content of the polymer electrolyte fiber 8 is within the above numerical range, a suitable size of the holes 9 can be formed in a suitable amount.

Examples of the catalytic substance 6 include: platinum group elements such as platinum, palladium, ruthenium, iridium, rhodium, and osmium; metals such as iron, lead, copper, chromium, cobalt, nickel, manganese, vanadium, molybdenum, gallium, and aluminum; and alloys thereof, oxides thereof, or composite oxides thereof. Of these materials, platinum or a platinum alloy is preferred. The catalytic substance 6 is preferred to have a particle size (average particle size D50) in the range of 0.5 nm or more and 20 nm or less, and more preferably in the range of 1 nm or more and 5 nm or less. This is because an excessively large particle size will reduce the activity of the catalytic substance 6, and an excessively small particle size will reduce the stability of the catalytic substance 6.

Any carbon particles may be used for the carbon particles 5 as long as they are microparticles and electrically conductive, and are not affected by the catalytic substance 6. The particle size (average particle size D50) of the carbon particles 5 is preferably in the range of 10 nm or more and 1000 nm or less, and more preferably in the range of 10 nm or more and 100 nm or less. This is because an excessively small particle size will cause difficulty in forming an electron conduction path, and an excessively large particle size will increase the thickness of the electrode catalyst layers 1 and 2 and increases the resistance, resulting in a decrease in the output characteristics.

By having the carbon particles 5, which are particulate carbon materials, support the catalytic substance 6, it is possible to increase the area of the carbon materials capable of supporting the catalytic substance 6, and thus the catalytic substance 6 can be supported at a high density. Accordingly, the catalyst activity can be improved.

The aggregate 7 of polymer electrolytes is a mass of the polymer electrolytes, which are ionomers, aggregated by a cohesive force. The cohesive force refers to Coulomb force and van der Waals force acting between ionomers. The particle size (average particle size D50) of the polymer electrolyte aggregate 7 is preferably in the range of 10 nm or more and 1000 nm or less, and even more preferably in the range of 10 nm or more and 100 nm or less. This is because an excessively small particle size will cause difficulty in forming an electron conduction path, and an excessively large particle size will increase the thickness of the electrode catalyst layers 1 and 2 and increase the resistance, resulting in a decrease in the output characteristics. In the present embodiment, the aggregate 7 of the polymer electrolyte is not limited to the form of an aggregate, and may be, for example, a non-aggregate of the polymer electrolyte. The particle size of the polymer electrolyte aggregate 7 (average particle size D50) is preferably larger than that of the carbon particles 5 (average particle size D50). The particle size (average particle size D50) of the polymer electrolyte aggregate 7 is preferably in the range of 1.05 times or more and 3 times or less the particle size (average particle size D50) of the carbon particles 5, and more preferably in the range of 1.5 times or more and 2 times or less. If the particle size (average particle size D50) of the aggregate 7 of the polymer electrolytes is within the above numerical range, a suitable size of the holes 9 can be formed in a suitable amount.

The polymer electrolyte fiber 8 is a polymer electrolyte in the form of an elongated shape, for example, due to cross-linking between polymer electrolytes.

The polymer electrolyte constituting the aggregate 7 and the polymer electrolyte constituting the polymer electrolyte fiber 8 may be ones having proton conductivity, and may be, for example, a fluorine-based polymer electrolyte or a hydrocarbon-based polymer electrolyte. Examples of the fluorine-based polymer electrolyte may be Nafion (registered trademark: manufactured by DuPont), Flemion (registered trademark) manufactured by AGC Inc., Aciplex (registered trademark) manufactured by AGC Inc., and Aquivion (registered trademark) manufactured by Solvay S.A. Examples of the hydrocarbon-based polyelectrolyte may be an electrolyte made from a sulfonated polyether ketone, sulfonated polyether sulfone, sulfonated polyether ether sulfone, sulfonated polysulfide, sulfonated polyphenylene, sulfonated polyimide, and an acid-doped polybenzoxazole.

The polymer electrolyte constituting the aggregate 7 and the polymer electrolyte constituting the polymer electrolyte fiber 8 may be the same or may be different from each other. Further, a polymer electrolyte constituting the aggregate 7, a polymer electrolyte constituting the polymer electrolyte fiber 8 and a polymer electrolyte constituting the polymer electrolyte membrane 3 may be the same as each other or may be different from each other. In order to enhance the adhesion of the electrode catalyst layers 1 and 2 to the polymer electrolyte membrane 3, the polymer electrolyte contained in the electrode catalyst layers 1 and 2 is preferably the same as the polymer electrolyte contained in the polymer electrolyte membrane 3.

Since the polymer electrolyte fibers 8 are included in the electrode catalyst layers 1 and 2, the polymer electrolyte fibers 8 are entangled with each other and function as a support in the electrode catalyst layers 1 and 2. Accordingly, cracking is suppressed in the electrode catalyst layers 1 and 2, which would otherwise be one factor in durability degradation of the membrane electrode assembly 10. Therefore, compared with the conventional case where the electrode catalyst layers 1 and 2 consist only of the catalytic substance-supporting carbon body 11 and the aggregate 7 of polymer electrolytes, occurrence of cracking in the electrode catalyst layers 1 and 2 is reduced.

The inventors of the present invention focused on the amount of P (phosphorus) and Pt (platinum) contained in the electrode catalyst layers 1 and 2, and found that by adjusting the quantity ratio, the appropriate amount of polymer electrolyte fiber 8 added in the electrode catalyst layers 1 and 2 can be determined.

This point will be described below.

The polymer electrolyte fiber 8 in the electrode catalyst layers 1 and 2 are preferably added so that the amount of P (phosphorus) and the amount of Pt (platinum) defined via elemental analysis by energy dispersive X-ray spectroscopy (EDX) in the cross-section of the electrode catalyst layers 1 and 2 in the thickness direction of the electrode catalyst layers 1 and 2 satisfy the following equation (1). Here, P (phosphorus), which is the measurement target, is an element thought to contribute to proton conductivity and is contained in the polymer electrolyte fiber 8. That is, the polymer electrolyte fiber 8 may be an organic electrolyte fibrous substance containing phosphorus (P).

The ratio of the amount of P (phosphorus) to the amount of Pt (platinum) (P/Pt) can be determined from each peak intensity ratio of the EDX spectrum, which is the result of analysis by energy-dispersive X-ray spectroscopy (EDX) described above.

$$0.1 \leq P/Pt \leq 3.0 \qquad \text{Equation (1)}$$

When the amount of polymer electrolyte fibers 8 added in the electrode catalyst layers 1 and 2 is within the range that satisfies the above equation (1), proton conduction in the electrode catalyst layers 1 and 2 is promoted, thereby improving the output of the fuel cell. If the equation $0 < P/Pt$ holds, the problem of the present application can be solved.

In the present embodiment, the measurement position of the elemental analysis by energy dispersive X-ray spectroscopy (EDX) is not limited to a cross section of each of the electrode catalyst layers 1 and 2, but may be the front surface of each of the electrode catalyst layers 1 and 2. When the measurement position of the elemental analysis by energy dispersive X-ray spectroscopy (EDX) is a cross section of the electrode catalyst layers 1 and 2, the electrode catalyst layers 1 and 2 are broken in the thickness direction thereof just before the elemental analysis to expose (form) the cross section which is the measurement surface, and therefore the possibility of the cross section of the electrode catalyst layers 1 and 2 becoming contaminated with impurities (contamination of the measurement site) is reduced and the measurement accuracy is improved. Elemental analysis measurements can be made very easily if the measurement position of the elemental analysis by energy dispersive X-ray spectroscopy (EDX) is the surface of the electrode catalyst layers 1 and 2. Therefore, even if the surfaces of the electrode catalyst layers 1 and 2 are contaminated with impurities, the number of elemental analysis measurements can be easily increased, and the S/N ratio (ratio of signal intensity to noise intensity) can be easily increased.

When the average fiber diameter of the polymer electrolyte fibers 8 is 2 μm or less, appropriate thinness for a fiber material contained in the electrode catalyst layers 1 and 2 can be ensured.

In order to improve the output of the polymer electrolyte fuel cell, it is desired that the gas supplied to the electrode catalyst layers 1 and 2 is suitably diffused into the electrode catalyst layers 1 and 2 through the holes 9 formed in the electrode catalyst layers 1 and 2, and that the water generated by the electrode reaction is appropriately discharged through the holes 9, particularly at the air electrode. The presence of the holes facilitates the formation of the interface between the gas, the catalytic substance-supporting carbon bodies 11, and the polymer electrolyte, and promotes the electrode reaction, thereby improving the output of the polymer electrolyte fuel cell.

In view of the above, it is preferable that the electrode catalyst layers 1 and 2 have an appropriate size and an appropriate amount of holes 9. When the average fiber diameter of the polymer electrolyte fiber 8 is 1 μm or less, sufficient gaps are formed in the structure in which the polymer electrolyte fibers 22 are entangled with each other in the electrode catalyst layers 1 and 2, and thus sufficient holes 9 are ensured. Accordingly, the output of the fuel cell can be improved. Further, when the average fiber diameter of the polymer electrolyte fiber 8 is in the range of 100 nm or more and 500 nm or less, the output of the fuel cell is particularly increased.

The average fiber length of the polymer electrolyte fibers 8 is greater than the average fiber diameter thereof, and may preferably be in the range of 1 μm or more and 150 μm or less, and more preferably be in the range of 80 μm or more and 100 μm or less. When the average fiber length of the polymer electrolyte fibers 8 is within the above range, aggregation of the polymer electrolyte fibers 8 in the electrode catalyst layers 1 and 2 is reduced, which facilitates formation of the holes 9. Further, when the average fiber length of the polymer electrolyte fibers 8 is within the above range, since a structure in which the polymer electrolyte fibers 8 are entangled with each other in the electrode catalyst layers 1 and 2 is suitably formed, the strength of the electrode catalyst layers 1 and 2 is increased. Accordingly, the effect of reducing occurrence of cracking is further enhanced.

Figure 3:
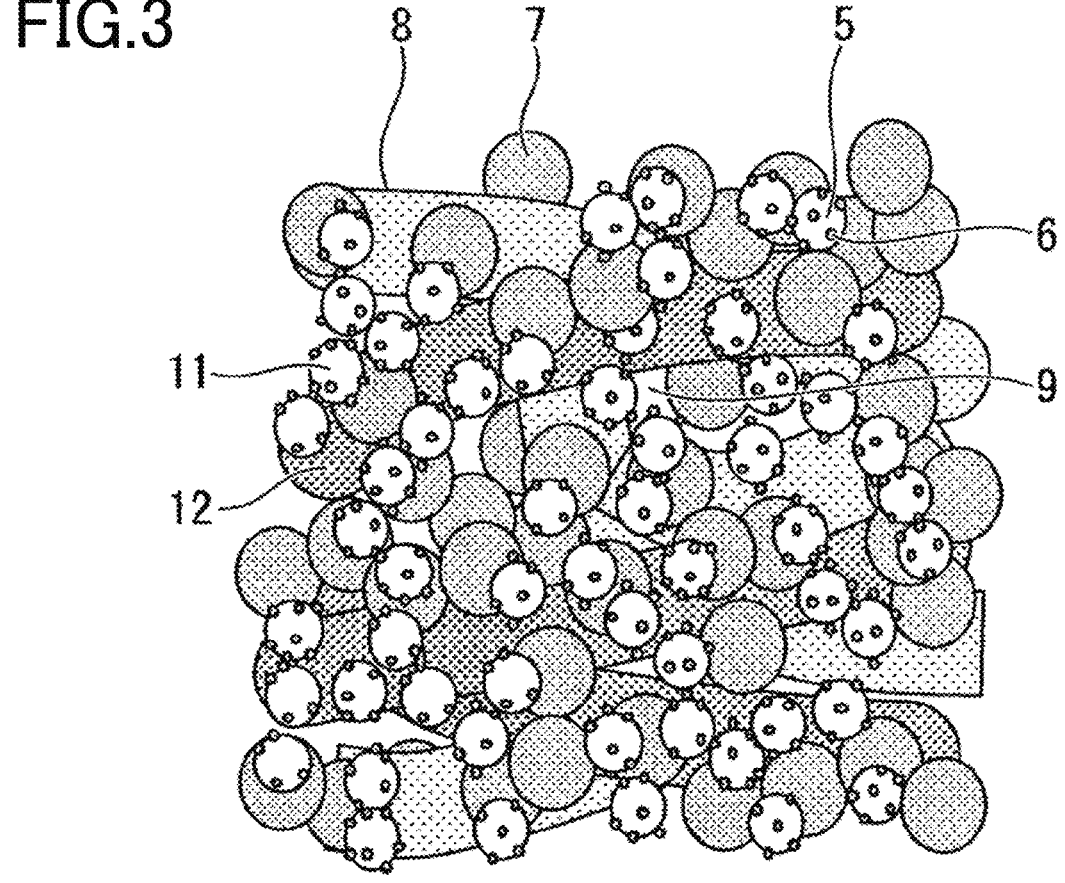
FIG. 3 is a cross-sectional view illustrating a second configuration example of an electrode catalyst layer according to the embodiment of the present invention.

FIG. 3 is a schematic cross-sectional view illustrating a second configuration of the electrode catalyst layer of the present embodiment. As shown in FIG. 3, each of the air electrode-side electrode catalyst layer 1 and the fuel electrode-side electrode catalyst layer 2 may further include carbon fibers 12, in addition to the catalytic substance-supporting carbon bodies 11, the aggregate 7 of polymer electrolytes, and the polymer electrolyte fibers 8.

The carbon fiber 12 is a fibrous structure whose constituent element is carbon. The carbon fiber 12 may be made of, for example, fibrous carbon materials such as carbon fibers, carbon nanofibers, and carbon nanotubes. Among the materials described above, carbon nanofibers or carbon nanotubes are preferably used.

The average fiber diameter of the carbon fiber 12 is preferably 200 nm or less, and more preferably 150 nm or less. When the average fiber diameter of the carbon fibers 12 is 200 nm or less, appropriate thinness for a fiber material contained in the electrode catalyst layers 1 and 2 can be ensured. When the average fiber diameter of the carbon fibers 12 is 10 nm or more, an appropriate thickness can be secured to enhance the strength of the electrode catalyst layers 1 and 2, thereby enhancing the effect of suppressing the occurrence of cracking.

The average fiber length of the carbon fibers 12 may preferably be in the range of 1 μm or more and 200 μm or less, and more preferably be in the range of 5 μm or more and 100 μm or less. When the average fiber length of the carbon fibers 12 is within the above range, since a structure in which the polymer electrolyte fibers 8 and the carbon fibers 12 are entangled with each other in the electrode catalyst layers 1 and 2 is suitably formed, the strength of the electrode catalyst layers 1 and 2 is increased. Accordingly, the effect of reducing occurrence of cracking is further enhanced.

In the second configuration, since the polymer electrolyte fibers 8 and the carbon fibers 12 as the fiber materials are entangled with each other to function as a support in the electrode catalyst layers 1 and 2, occurrence of cracking in the electrode catalyst layers 1 and 2 is reduced as with the first configuration.

The content of the carbon fiber 12 is preferably in the range of 2% by mass or more and 50% by mass or less, more preferably in the range of 10% by mass or more and 40% by mass or less, and more preferably in the range of 20% by mass or more and 40% by mass or less with respect to the content of the aggregate 7 of the polymer electrolyte. If the content of the polymer electrolyte fiber 8 is within the above numerical range, a suitable size of the holes 9 can be formed in a suitable amount in the electrode catalyst layers 1 and 2.

The average fiber diameter of the carbon fibers 12 is preferably smaller than the average fiber diameter of the polymer electrolyte fibers 8, more preferably in the range of 10% or more and 70% or less, more preferably in the range of 20% or more and 50% or less, and most preferably in the range of 30% or more and 40% or less of the average fiber diameter of the polymer electrolyte fibers 8.

The average fiber length of the carbon fibers 12 is preferably smaller than the average fiber length of the polymer electrolyte fibers 8, and may preferably be in the range of 10% or more and 70% or less, more preferably in the range of 20% or more and 50% or less, and most preferably in the range of 30% or more and 40% or less of the average fiber length of the polymer electrolyte fibers 8.

If the average fiber diameter and the average fiber length of the carbon fibers 12 are within the above numerical range, a suitable size of the holes 9 can be formed in suitable amount in the electrode catalyst layers 1 and 2.

Even when the electrode catalyst layers 1 and 2 includes only the carbon fibers 12 as the fiber material, and does not include the polymer electrolyte fibers 8, a structure in which the carbon fibers 12 are entangled with each other is formed, and thus cracking can be reduced. However, since the carbon fibers 12 contribute only to electron conduction, and do not contribute to proton conduction, the ratio of the polymer electrolyte included in the electrode catalyst layers 1 and 2 decreases in the structure in which the electrode catalyst layers 1 and 2 consist only the carbon fibers 12 as the fiber material. As a consequence, proton conductivity in the electrode catalyst layers 1 and 2 tends to decrease. In this case, it is possible to compensate for the proton conductivity by increasing the amount of the aggregate 7 of the polymer electrolyte, but the diffusivity of the gas and the drainage properties tend to decrease because the holes 9 decrease.

On the other hand, in the present embodiment, in which the electrode catalyst layers 1 and 2 include the polymer electrolyte fibers 8 as the fiber material, compared with the case where it includes only the carbon fibers 12 as the fiber material, proton conduction in the electrode catalyst layers 1 and 2 can be promoted while ensuring a sufficient quantity of the holes 9.

In order to extract electrons generated by an electrode reaction, the electrode catalyst layers 1 and 2 are also required to have electron conductivity. When the electrode catalyst layers 1 and 2 include the polymer electrolyte fibers 8 and the carbon fibers 12 as the fiber material, the electrode catalyst layers 1 and 2 have favorable proton conductivity, electron conductivity, and formation of the holes 9. Accordingly, the output of the polymer electrolyte fuel cell can be improved.

The average fiber diameter and the average fiber length of the polymer electrolyte fibers 8 and the carbon fibers 12 can be measured by observing the cross-section of the electrode catalyst layer, for example, by using a scanning electron microscope. For example, the average fiber diameter is the average of maximum diameters for each fiber contained in 3 or more measurement areas with a size of 30 μm×30 μm in the cross-section described above. For example, the average fiber length is the average of maximum lengths for each fiber contained in 3 or more measurement areas with a size of 300 μm×300 μm in the cross-section described above.

Figure 4:
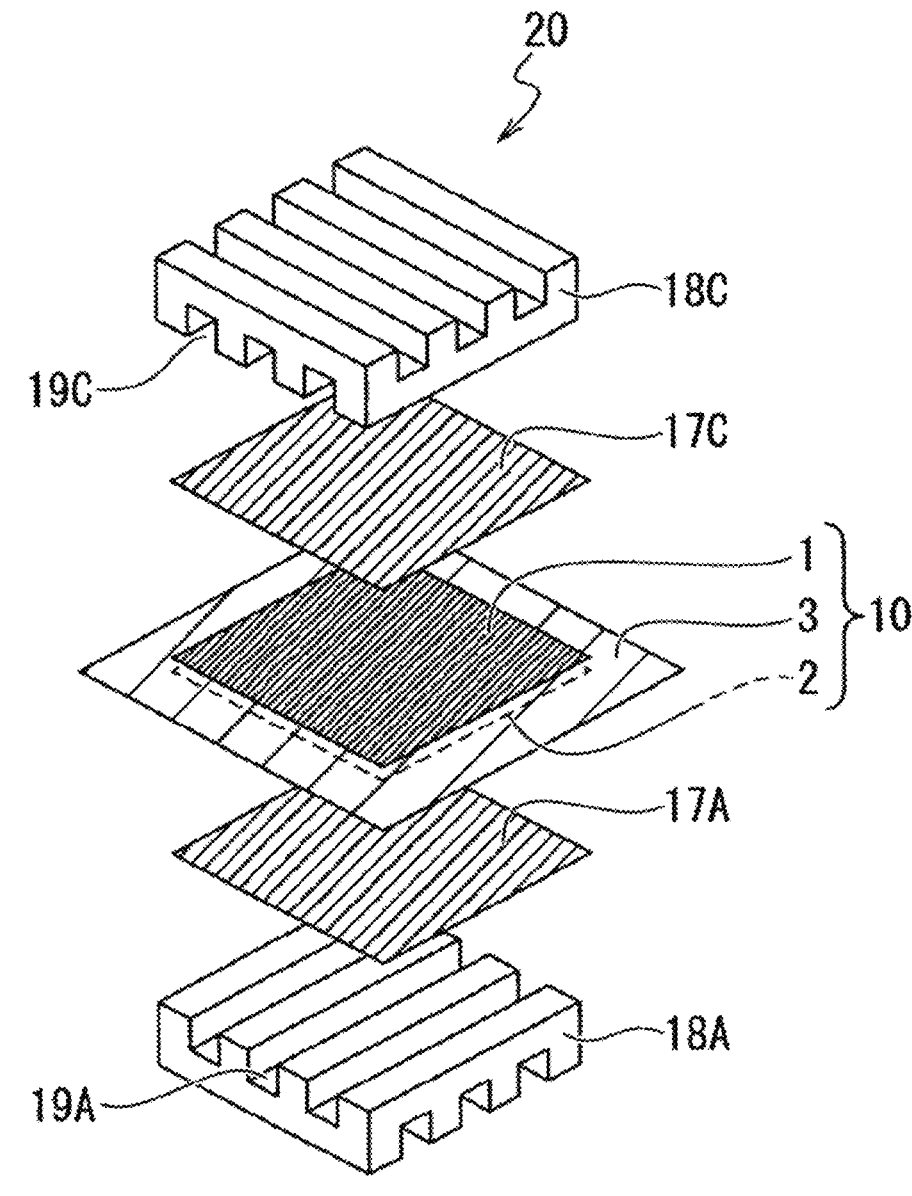
FIG. 4 is an exploded perspective view of a configuration example of a polymer electrolyte fuel cell provided with the membrane electrode assembly according to the embodiment of the present invention.

FIG. 4 is an exploded perspective view of a configuration example of a single cell 20 of the polymer electrolyte fuel cell that includes the membrane electrode assembly 10. The air electrode-side gas diffusion layer 17C and the fuel electrode-side gas diffusion layer 17A are arranged opposite to the air electrode-side electrode catalyst layer 1 and fuel electrode-side electrode catalyst layer 2 of the membrane electrode assembly 10, respectively. Furthermore, a laminate is sandwiched between the air electrode-side separator 18C and the fuel electrode-side separator 18A to form a single cell 20. The laminate is composed of the membrane electrode assembly 10, the air electrode-side gas diffusion layer 17C and the fuel electrode-side gas diffusion layer 17A.

A set of separators 18A and 18C is formed of a conductive and gas impermeable material, and has an air electrode-side gas flow path 19C for reaction gas flow arranged facing the air electrode-side gas diffusion layer 17C, and a fuel electrode-side gas flow path 19A for reaction gas flow arranged facing the fuel electrode-side gas diffusion layer 17A.

In this single cell 20, an oxidant such as air or oxygen is supplied to the membrane electrode assembly 10 by passing it through the air electrode-side gas flow path 19C of the air electrode-side separator 18C and then through the air electrode-side gas diffusion layer 17C. Additionally, a fuel gas including hydrogen or organic fuel is supplied to the membrane electrode assembly 10 by passing it through the fuel electrode-side gas flow path 19A of the fuel electrode-side separator 18A and then through the fuel electrode-side gas diffusion layer 17A. Accordingly, the aforementioned electrochemical reactions (Reaction 1) and (Reaction 2) occur in the membrane electrode assembly 10 to generate electric power.

The single cell 20 of the polymer electrolyte fuel cell may be used in the single-cell state as shown in FIG. 4, or may be used as a single fuel cell in which a plurality of single cells 20 are laminated and connected in series.

In addition to the polymer electrolyte membrane 3 and the electrode catalyst layers 1 and 2, the membrane electrode assembly 10 may also include the gas diffusion layers 17A and 17C described above. In addition, the polymer electrolyte fuel cell 20 may include a membrane electrode assembly 10 provided with a gasket 4 on at least one surface of the polymer electrolyte membrane 3. The gasket 4 has a function of preventing leakage of gas, supplied to the electrode catalyst layers 1 and 2, from the fuel cell (see FIG. 1). The gasket 4 may be disposed surrounding the outer periphery of the laminate formed of the polymer electrolyte membrane 3 and the electrode catalyst layers 1 and 2.

(Method of Producing Electrode Catalyst Layer)

The electrode catalyst layers 1 and 2 of the present embodiment can be produced by preparing an electrode catalyst layer slurry and applying it to a substrate or the like, followed by drying.

The electrode catalyst layer slurry is obtained by adding a polymer electrolyte powder or an electrolyte solution in which a polymer electrolyte powder is dissolved or dispersed, the catalytic substance-supporting carbon bodies 11, and the polymer electrolyte fibers 8 to a solvent, followed by mixing. The polymer electrolyte fiber 8 is formed of, for example, by using an electrospinning technique or the like. In formation of the electrode catalyst layers 1 and 2 having the second configuration, the electrode catalyst layer slurry further includes the carbon fibers 12.

The solvent of the electrode catalyst layer slurry is not particularly limited but is preferred to be a solvent that can disperse or dissolve the polymer electrolyte. Examples of a typically used solvent include water; alcohols such as methanol, ethanol, 1-propanol, 2-propanol, 1-butanol, 2-butanol, isobutyl alcohol, and tert-butyl alcohol; ketones such as acetone, methyl ethyl ketone, methyl propyl ketone, methyl butyl ketone, methyl isobutyl ketone, methyl amyl ketone, pentanone, heptanone, cyclohexanone, methyl cyclohexanone, acetonylacetone, diethylketone, dipropyl ketone, and diisobutyl ketone; ethers such as tetrahydrofuran, tetrahydropyran, dioxane, diethylene glycol dimethylether, anisole, methoxy toluene, diethylether, dipropylether, and dibutylether; amines such as isopropylamine, butylamine, isobutylamine, cyclohexylamine, diethylamine, and aniline; esters such as propyl formate, isobutyl formate, amyl formate, methyl acetate, ethyl acetate, propyl acetate, butyl acetate, isobutyl acetate, pentyl acetate, isopentyl acetate, methyl propionate, ethyl propionate, and butyl propionate; other acetic acids, propionic acid, dimethylformamide, dimethylacetamide, and N-methylpyrrolidone. The glycols or glycol ether solvents may include ethylene glycol, diethylene glycol, propylene glycol, ethylene glycol monomethylether, ethylene glycol dimethylether, ethylene glycol diethylether, diacetone alcohol, 1-methoxy-2-propanol and 1-ethoxy-2-propanol.

For the substrate for forming the electrode catalyst layers 1 and 2, a transfer substrate which is removed after the electrode catalyst layers 1 and 2 are transferred to the polymer electrolyte membrane 3 is used. The transfer substrate may be formed of, for example, a resin film. Alternatively, the polymer electrolyte membrane 3, or the gas diffusion layers 17A and 17C may be used as the substrate for forming the catalyst layers 1 and 2.

The method of applying the electrode catalyst layer slurry to the substrate is not particularly limited but may be, for example, doctor blading, die coating, dipping, screen printing, laminator roll coating, or spraying.

The method of drying the electrode catalyst layer slurry applied to the substrate may be, for example, hot-air drying or IR drying. The drying temperature of the electrode catalyst layer slurry may be 40° C. or more and 200° C. or less, preferably 40° C. or more and 120° C. or less. The drying time of the electrode catalyst layer slurry may be 0.5 minutes or more and 1 hour or less, preferably 1 minute or more and 30 minutes or less.

When a transfer substrate or the gas diffusion layers 17A and 17C are used as the substrate for forming the electrode catalyst layers 1 and 2, the electrode catalyst layers 1 and 2 are joined to the polymer electrolyte membrane 3 by thermocompression bonding. When a transfer substrate is used as the substrate, the transfer substrate is removed from the electrode catalyst layers 1 and 2 after the electrode catalyst layers 1 and 2 are joined. When the gas diffusion layers 17A and 17C are used as the substrate, removing the substrate is not required.

According to a production method which uses the polymer electrolyte membrane 3 as the substrate for forming the electrode catalyst layers 1 and 2, each of the electrode catalyst layers 1 and 2 are directly formed on the polymer electrolyte membrane 3. For this reason, increased adhesion between the polymer electrolyte membrane 3 and each of the electrode catalyst layers 1 and 2 can be obtained, and no pressure is required to join the electrode catalyst layers 1 and 2. Accordingly, the electrode catalyst layers 1 and 2 are prevented from being crushed (crush of the holes 9 is prevented). Therefore, it is preferred to use the polymer electrolyte membrane 3 as a substrate for forming the electrode catalyst layers 1 and 2.

Since the polymer electrolyte membrane 3 generally has characteristics of swelling and shrinking greatly, using the polymer electrolyte membrane 3 as a substrate causes a large change in volume of the substrate in the step of drying the coating film, which is used for forming the electrode catalyst layers 1 and 2, compared with a case where a transfer substrate or the gas diffusion layers 17A and 17C are used as the substrate. Therefore, in the conventional configuration in which the electrode catalyst layer does not include the fiber material, cracks are likely to occur in the electrode catalyst layer. On the other hand, in the case of the electrode catalyst layers 1 and 2 of the present embodiment, even if the volume of the polymer electrolyte membrane 3, which is the base material, greatly changes in the process of forming the electrode catalyst layers 1 and 2, the occurrence of cracking is prevented by the inclusion of the fiber material. Accordingly, the production method using the polymer electrolyte membrane 3 as the base material for forming the electrode catalyst layers 1 and 2 can be used.

The polymer electrolyte fuel cell 20 is produced by assembling the gas diffusion layers 17A and 17C and the separators 18A and 18C to the membrane electrode assembly 10, and further providing a gas supply mechanism and the like.

EXAMPLES

Next, examples based on the present invention are illustrated.

Example 1

20 g of carbon-supported platinum (TEC10E50E manufactured by Tanaka Kikinzoku Kogyo) was placed in a container, and then water was added and mixed, followed by adding a polymer electrolyte fiber (acid-doped polybenzoxazole), 1-propanol, and a polymer electrolyte (dispersion of Nafion (trademark) manufactured by Wako Pure Chemical Industries Co., Ltd. (FUJIFILM Wako Pure Chemical Corporation, currently)), further followed by stirring, thereby obtaining an electrode catalyst layer slurry. The average fiber diameter of the polymer electrolyte fibers was 400 nm and the average fiber length was 30 μm. In the present example, the average fiber diameter is a value rounded to the nearest 10, and the average fiber length is a value rounded to the nearest 1. The electrode catalyst layer slurry was prepared by adjusting the mass of the polymer electrolyte to be 100% by mass with respect to the mass of the carbon particles, the mass of the polymer electrolyte fiber to be 10% by mass with respect to the mass of the carbon particles, the ratio of the water in the dispersion medium to be 50% by mass, and the solid concentration to be 10% by mass.

The obtained electrode catalyst layer slurry was applied to a polymer electrolyte membrane (Nafion 212: manufactured by DuPont) by a die coating technique, and dried in a furnace at 80° C. to thereby obtain a membrane electrode assembly of Example 1 having a pair of electrode catalyst layers and a polymer electrolyte membrane. Furthermore, the membrane electrode assembly was sandwiched by two gas diffusion layers (SIGRACET 29BC: manufactured by SGL Carbon) to form a polymer electrolyte fuel cell of Example 1 by using a standard cell obtained from JARI.

Example 2

The electrode catalyst layer and membrane electrode assembly for the polymer electrolyte fuel cell of Example 2 were obtained by the same procedure as in Example 1, except that the mass of the polymer electrolyte fiber was set at 30% by mass relative to the mass of the carbon particles.

Example 3

The electrode catalyst layer and the membrane electrode assembly for the polymer electrolyte fuel cell of Example 3 were obtained by the same procedure as in Example 1, except that carbon fibers (fiber diameter of approximately 150 nm, fiber length of approximately 10 μm) were added to the electrode catalyst layer slurry prepared in Example 1 so that the mass of the carbon fibers was 10% by mass relative to the mass of the carbon particles, and then stirred to thereby obtain an electrode catalyst layer slurry used in Example 3.

Comparative Example 1

The electrode catalyst layer and membrane electrode assembly for the polymer electrolyte fuel cell of Comparative Example 1 were obtained by the same procedure as in Example 1, except that the mass of the polymer electrolyte fiber was set at 50% by mass relative to the mass of the carbon particles.

Comparative Example 2

The electrode catalyst layer and membrane electrode assembly for the polymer electrolyte fuel cell of Comparative Example 2 were obtained by the same procedure as in Example 1, except that the polymer electrolyte fiber was not added.

Comparative Example 3

The electrode catalyst layer and membrane electrode assembly for the polymer electrolyte fuel cell of Comparative Example 3 were obtained by the same procedure as in Example 3, except that the polymer electrolyte fiber was not added.
[Evaluation of Power Generation Performance]

In order to measure the power generation performance, a JARI standard cell was used as a single cell for evaluation, in which a gas diffusion layer, a gasket, and a separator were placed on both sides of the membrane electrode assembly, and tightened to a specified surface pressure in accordance with "Cell Evaluation and Analysis Protocol" published by the New Energy and Industrial Technology Development Organization (NEDO). Then, I-V measurement (under "standard" conditions) was performed according to the method described in "Cell Evaluation and Analysis Protocol".

Table 1 shows the measurement results of the power generation performance of the single cell for evaluation using each electrode catalyst layer in Examples 1 to 3 and Comparative Examples 1 to 3. For power generation performance, a case where the current was 30 A or more at a voltage of 0.6 V was evaluated as "Good" and a case where the current was less than 30 A was evaluated as "Poor". If the evaluation result is "Good", there is no problem in using the power generation performance.
[Evaluation of Elemental Analysis of Electrode Catalyst Layer]

Figure 5:
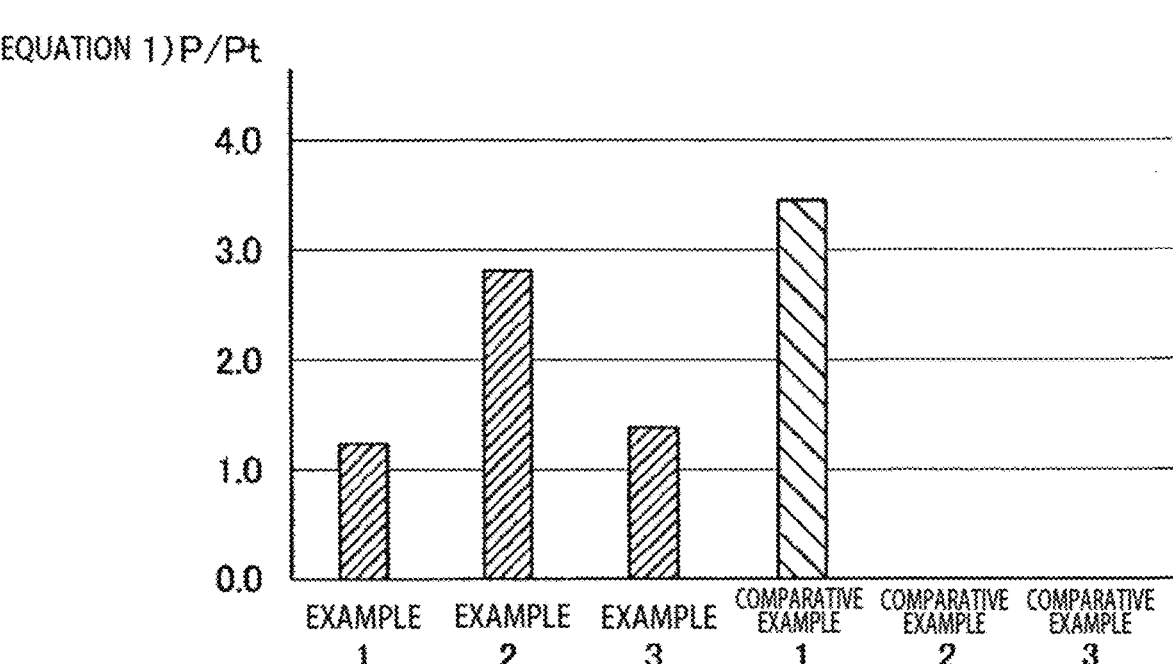
FIG. 5 is a diagram illustrating the results of elemental analysis by energy dispersive X-ray spectroscopy (EDX) in Examples and Comparative Examples of the present invention.

Elemental analysis by energy dispersive X-ray spectroscopy (EDX) was performed on each electrode catalyst layer of Examples 1 to 3 and Comparative Examples 1 to 3 after the evaluation of power generation performance described above. The evaluation results are illustrated in FIG. 5. FIG. 5 is a graph showing the ratio (P/Pt) of the amount of P (phosphorus) to the amount of Pt (platinum) defined via elemental analysis by energy dispersive X-ray spectroscopy (EDX) in a cross section of each electrode catalyst layer of Examples 1 to 3 and Comparative Examples 1 to 3 on the vertical axis.
[Evaluation of Crack Occurrence]

For the membrane electrode assemblies of the Examples and Comparative Examples, the surface of the electrode catalyst layer was observed by using a microscope (magnification: 200 times) to examine for the occurrence of cracking, which is one factor in durability degradation of the membrane electrode assembly. In this evaluation, the case where a crack of 10 μm length or more was found was evaluated as "Poor", and the case where no cracks of 10 μm length or more were found was evaluated as "Good". The result is illustrated in Table 1.
[Durability Evaluation]

For the measurement of durability, the same single cell as the single cell for evaluation used for the measurement of power generation performance was used as the single cell for evaluation. Durability was then measured by a humidity cycle test as described above in "Cell Evaluation and Analysis Protocol".

For durability, a case where the power generation performance after the 10,000 cycle test shows 70% or more of the power generation performance before the cycle test was evaluated as "Good" and a case where the power generation performance was lower than 70% was evaluated as "Poor".

The result is illustrated in Table 1.

TABLE 1

| | Power generation performance | Cracking | Durability |
|---|---|---|---|
| Example 1 | Good | Good | Good |
| Example 2 | Good | Good | Good |
| Example 3 | Good | Good | Good |
| Comparative Ex. 1 | Poor | Good | Good |
| Comparative Ex. 2 | Poor | Poor | Poor |
| Comparative Ex. 3 | Poor | Good | Good |

As shown in Table 1, the power generation performance was evaluated as "Good" in Examples 1 to 3. That is, in Examples 1 to 3, a membrane electrode assembly was obtained that is capable of constituting a fuel cell excellent in power generation performance.

In Comparative Example 1, cracking was suppressed by adding polymer electrolyte fibers. On the other hand, power generation performance was evaluated as "Poor". This suggests that holes were not suitably formed in the electrode catalyst layer due to the large amount of added polymer electrolyte fibers. The ratio of P/Pt in this is 3.5, which, when compared with the power generation performance of Example 2 where the ratio of P/Pt is 2.8, it is suggested that high power generation performance is obtained when the ratio of P/Pt is approximately 3.0 or less.

In Comparative Example 2, cracking occurred because the electrode catalyst layer did not contain polymer electrolyte fibers (fibrous substance).

In Comparative Example 3, cracking was suppressed because carbon fibers are contained in the electrode catalyst layer. On the other hand, power generation performance was evaluated as "Poor". This suggests that sufficient proton conductivity could not be obtained in comparison with Examples 1 and 2 because polymer electrolyte fibers were not contained in the electrode catalyst layer.

As described above, according to the present embodiment, the electrode catalyst layer for a polymer electrolyte fuel cell includes at least: catalyst-supporting carbon particles which support the catalyst; a polymer electrolyte; and polymer electrolyte fibers, and preferably includes carbon fibers. In the electrode catalyst layer, when the amount of P and the amount of Pt defined via elemental analysis by energy dispersive X-ray spectroscopy (EDX) in the cross section of the electrode catalyst layer satisfy the following equation (1), the proton conductivity in the electrode catalyst layer is improved and the holes are favorably formed, so that crack generation, which would otherwise be one factor of durability degradation of the membrane electrode assembly, does not occur (or is extremely limited), and high power generation performance is exhibited.

$$0 < P/Pt \le 3.0 \qquad \text{Equation (1)}$$

INDUSTRIAL APPLICABILITY

The present invention has high utility value in industry because it has a remarkable effect on improving the power output of a fuel cell during power generation. For example, the present invention is extremely suitable for application to polymer electrolyte fuel cells.

REFERENCE SIGNS LIST

1 . . . Air electrode-side electrode catalyst layer; 2 . . . Fuel electrode-side electrode catalyst layer; 3 . . . Polymer electrolyte membrane; 4 . . . Gasket; 5 . . . Carbon particle; 6 . . . Catalytic substance (catalyst particle, catalyst); 7 . . . Aggregate; 8 . . . Polymer electrolyte fiber; 9 . . . Hole; 10 . . . Membrane electrode assembly; 11 . . . Catalytic substance-supporting carbon body; 12 . . . Carbon fiber; 20 . . . Single cell (polymer electrolyte fuel cell); 17A . . . Fuel electrode-side gas diffusion layer; 17C . . . Air electrode-side gas diffusion layer; 18A . . . Fuel electrode-side separator; 18C . . . Air electrode-side separator; 19A . . . Fuel electrode-side gas flow path; 19C . . . Air electrode-side gas flow path.

What is claimed is:

1. An electrode catalyst layer, comprising:
   a catalyst;
   catalyst-supporting carbon particles which support the catalyst;
   a polymer electrolyte; and
   a fibrous substance, wherein
   in the electrode catalyst layer, an amount of phosphorus (P) and an amount of platinum (Pt) defined via elemental analysis by energy dispersive X-ray spectroscopy (EDX) satisfy a following equation (1)

$$0 < P/Pt \le 3.0 \qquad \text{Equation (1)}.$$

2. The electrode catalyst layer of claim 1, wherein the fibrous substance has an average fiber diameter in a range of 100 nm or more and 500 nm or less.

3. The electrode catalyst layer of claim 1, wherein the fibrous substance has an average fiber length in a range of 1 μm or more and 150 μm or less.

4. The electrode catalyst layer of claim 1, further comprising carbon fibers.

5. The electrode catalyst layer of claim 1, wherein the fibrous substance is made of a polymer electrolyte.

6. A membrane electrode assembly comprising:
   a polymer electrolyte membrane; and
   a pair of electrode catalyst layers sandwiching the polymer electrolyte membrane, wherein
   at least one of the electrode catalyst layers serves as the electrode catalyst layer of claim 1.

7. A polymer electrolyte fuel cell comprising:
   the membrane electrode assembly of claim 6; and
   a pair of separators sandwiching the membrane electrode assembly.

\* \* \* \* \*